United States Patent [19]

Trubiano et al.

[11] 4,310,356

[45] Jan. 12, 1982

[54] AQUEOUS NEWSPRINT INKS

[75] Inventors: Paolo C. Trubiano, Somerville; Aaron Y. Cohen, Union, both of N.J.

[73] Assignees: National Starch and Chemical Corporation, Bridgewater; Synres Chemical Corporation, Union, both of N.J.

[21] Appl. No.: 189,975

[22] Filed: Sep. 22, 1980

[51] Int. Cl.$^3$ .............................................. C09D 11/14
[52] U.S. Cl. ...................................................... 106/25
[58] Field of Search .................................... 106/25, 23

[56] References Cited

U.S. PATENT DOCUMENTS

| | | | |
|---|---|---|---|
| 1,364,406 | 1/1921 | Olsen | 106/25 |
| 3,615,751 | 10/1971 | Lecha et al. | 106/25 |
| 3,803,070 | 4/1974 | Spencer et al. | 106/25 |

OTHER PUBLICATIONS

Sci. Am., Jan. 8, 1910, p. 32.

*Primary Examiner*—John Kight, III
*Assistant Examiner*—Amelia B. Yarbrough
*Attorney, Agent, or Firm*—Edwin M. Szala; Janet E. Hasak

[57] ABSTRACT

In an improved process for printing newsprint paper with a light-weight keyless printing press system the mineral oil ink standardly used is replaced by an aqueous newsprint ink having a total solids content of about 13–80% and containing about 2–30% of a colorant consisting of a pigment and/or dye, about 3–60% of a dispersed starch, and water to total 100%, wherein the percentages are by weight based on total weight of the ink. The ink may optionally contain a viscosity stabilizer if necessary to prevent retrogradation of the starch or a thickener. In a preferred embodiment the pigment is carbon black and the starch is a dextrin or waxy fluidity starch.

10 Claims, No Drawings

AQUEOUS NEWSPRINT INKS

BACKGROUND OF THE INVENTION

This invention relates to an aqueous newsprint ink and to an improved process for printing newsprint paper with such ink.

A typical newspaper printing press in current use is a letterpress unit comprised of a train of rollers contiguously arranged to distribute a thin film of newsprint ink for transfer to the typographic or photopolymer plate. The letterpress system presently in use is a heavy piece of equipment and necessarily consumes large amounts of energy, a major factor in determining the cost of the installation and operation. Moreover, newspaper printing by the letterpress technique requires frequent adjustments of roller settings to maintain a uniform ink application, thereby necessitating additional manpower to monitor the system. At times, letterpress printing also creates ink misting, whereby at high speeds an ink which is too thin will cause a fine spray of ink to be thrown off by the rapidly moving rollers, thereby coating the press and its environs with a sticky layer of ink. Ink misting may be attributed to an improperly formulated ink composition, hard or imperfect rollers, old or uneven blankets or improper roller settings.

Many of these equipment difficulties have been overcome by the use of a recently introduced simplified light-weight printing system which contains fewer rollers, commonly called a "keyless" system because it lacks the adjusting keys used to control the ink on the rollers of standard letterpress equipment. One example of this light-weight equipment is the ANPAPRESS (trademark) system developed by the American Newspaper Publishers Association Research Institute. The keyless letterpress has many desirable characteristics, including reduced ink misting and paper waste, as well as decreased space and energy requirements due to the light-weight design.

The standard newsprint inks employed almost exclusively in both the letterpress and keyless systems consist of printing-grade carbon black pigment (or dyes and/or other pigments to accentuate color density or for colored ink) suspended in mineral oil in the optional presence of an oil-soluble toner dye such as induline base for high-speed presses or a small amount of rosin oil or other resin for slower-moving presses. Mineral oil is used as the pigment vehicle because it remains fluid until it penetrates into the absorbent newspaper stock. In contrast, comparable newsprint inks containing water and/or organic solvents evaporate before they reach the stock, and are thus generally considered undesirable for use in both the letterpress and keyless printing systems.

The standard newsprint ink, however, suffers from a number of disadvantages. One is that the mineral oil vehicle contained therein is a petroleum derivative, with its accompanying high cost, pollution effects and dependence for its supply on fluctuating markets. In addition, mineral oil acts only as a carrier for the pigment, not a binder. When the ink is deposited, most of the mineral oil penetrates into the porous stock; but due to the nature of mineral oil, the ink that remains on the surface never dries. As a result, "offsetting" occurs whereby part of the printed image is transferred to another surface which has come into contact with the ink, e.g., the ink is readily removed by rubbing the surface. The oil may also penetrate the stock and show as an oil stain or "strike through" on the back of the sheet, imparting a brownish tone to the paper. Moreover, it is difficult to obtain a clear printed copy with standard newsprint inks because the mineral oil, as it is absorbed, creates a halo around the printed image, thereby blurring the edges of the image.

Accordingly, it is an object of the present invention to provide an improved newsprint ink derived from readily available, less expensive raw materials with fewer accompanying pollution problems, which ink contains a binder to fix the pigment into the paper so that "striking through", "offsetting" and blurring of the printed image are minimized or eliminated.

It is another object to provide a newsprint ink especially designed for use in conjunction with the light-weight keyless printing press system. It is a further object to provide an improved printing process whereby an aqueous newsprint ink is employed.

SUMMARY OF THE INVENTION

The above and related objects are achieved in an improved process for printing newsprint paper with a printing ink employing a light-weight keyless printing press system, wherein the improvement comprises using as the printing ink an aqueous newsprint ink having a total solids content of about 13–80% and comprising about 2–30% of a colorant consisting of a pigment, dye or mixture thereof, about 3–60% of a dispersed starch, and water as the remainder of the ink in an amount to total 100%, wherein the percentages are by weight based on total weight of the ink.

This invention also embodies an aqueous newsprint ink composition applicable for a light-weight keyless printing press system as above described wherein the colorant is carbon black pigment.

Unexpectedly from the teachings of the prior art, it has now been found that an aqueous newsprint ink having the characteristics herein described can be utilized in such a printing press system without losing its requisite fluidity before reaching the paper stock. The result represents a substantial improvement over the mineral oil ink of the prior art for a number of reasons, one of which is the obvious advantages associated with a water-based system. Secondly, the ink composition herein contains starch, which functions primarily in providing viscosity, but also acts as a binder for the pigment, with the result that the pigment cannot be smeared or offset from the newsprint paper when the ink has dried. As another advantage, a clear printing image is obtained and "strike-through" is eliminated because of reduced penetration of the pigment binder into the paper. Furthermore, the process herein whereby the newsprint ink is employed in conjunction with the light-weight keyless printing press has an added benefit in coupling the advantages of the aqueous ink composition with those of the keyless system to give a newsprinting operation which is far superior to those operations presently in use.

DESCRIPTION OF THE PREFERRED EMBODIMENTS

The applicable starch bases which may be employed to prepare the dispersed starch for use as the ink binder may be derived from any plant source including corn, waxy corn, hig amylose corn, potato, sweet potato, wheat, rice, sago, tapioca, sorghum, or the like. Also included are conversion products derived from any of the latter bases including, for example, dextrins prepared by the hydrolytic action of acid and/or heat; oxidized starches prepared by treatment with oxidants such as sodium hypochlorite; fluidity or thin-boiling starches prepared, for example, by enzyme conversion, acid hydrolysis or thermal breakdown; derivatized starches such as ethers and esters; and crosslinked starches. Thus, included within the term "starch" herein are a variety of starch degradation products such as dextrins, thin-boiling starches and maltodextrins. It is noted that the starch in the ink composition herein must be dispersed in the aqueous medium of the ink. This dispersed starch may be prepared by cooking a granular starch in water using known techniques or by heat-extrusion to swell the starch granules. Alternatively, a cold-water dispersible starch may be employed as the dispersed starch, in which case the starch need not be further treated before addition to the other ingredients of the ink. Cold-water dispersibility is obtained by pregelatinizing the starch through, e.g., drum-drying or spray-drying, or by modifying the starch by such treatments as derivatization or dextrinization, to give it the properties of a dispersed starch. One preferred type of starch herein is a dextrin because it is a dispersed starch having a low and stable viscosity. Another preferred starch is waxy fluidity starch or derivatized fluidity starch.

The amount of starch to be employed in the ink herein will vary with such factors as, for example, the type of starch, the type and amount of colorant and/or other ink solids, and the viscosity desired in the final composition. Thus, when starches are used having a relatively high molecular weight such as waxy corn starch, amounts as low as only about 3% up to 10% starch by weight of the total composition need be employed, particularly if the viscosity of the ink composition desired can be relatively low. On the other hand, amounts of up to about 60% by weight of starch may be utilized, if desired, if starches having a low molecular weight such as dextrins or maltodextrins are employed or if highly viscous inks are desired. The preferred amounts of starch to be employed are 15-55% by weight. It is noted that if lower amounts of starch are employed, the amount of colorant and/or other ink solids should be increased proportionately to obtain good color density and printability.

The colorant for the ink employed in the process of this invention may be a pigment such as carbon black, a dye such as acid black or direct black dyes, or a mixture of pigments and/or dyes, but most commonly the colorant is printing-grade carbon black pigment, which is the standard colorant of the newsprint industry and is available as a dry powder or in bead or paste form. Other pigments and/or dyes which are water soluble or water dispersible may partially or totally replace the carbon black pigment if colors other than black or a different color density or tone is desired. An example of such a toner is Powdura Blue GP (trademark of Sherwin-Williams Company).

The amount of colorant to be used generally ranges from about 2 to 30% by weight of the total composition, depending mainly on the amount of starch solids, the particle size and density of the pigment and the color density of the ink desired. Thus, lower amounts of a colorant can be employed if it has a small particle size and high color density. The preferred amount is 10-25%.

The remainder of the ink, absent optional ingredients, is comprised of water, the exact amount being determined by, for example, the viscosity desired and the type of starch employed. However, the ink composition of this invention must have a total solids content ranging from about 13 to 80%, preferably 30-70%, by weight, to insure good color density and printability. The term "solids" as used herein refers to the starch, colorant and any other solid ingredients which optionally may be added.

It is preferred that the ink herein have a stable viscosity, i.e., it should not undergo substantial viscosity changes on aging, although ink compositions which change in viscosity upon aging are also within the scope of this invention. Many starches in solution tend to increase in viscosity with time, particularly at low temperatures, due to retrogradation whereby the starch molecules associate, forming in some cases a gel. This retrogradation of the starch can be reduced or eliminated by chemical and/or physical modification of the starch or by the addition of a viscosity stabilizer to interfere with the intermolecular associations. A combination of these methods may be employed with good results. These stabilizers may be present in an amount which depends mainly on the starch employed and the degree of stability required. Representative of such viscosity stabilizers are salts such as, for example, calcium chloride, sodium nitrate, urea, zinc chloride or the like, and other additives known to stabilize starch solutions such as surfactants. These additives, in addition to plasticizers such as glycerol known to alter the drying rate of inks, may also function, if desirable, to prevent drying out of the ink on the ink distribution system.

Further additives which may be employed as desired to impart various properties to the ink include surface-tension modifiers, viscosity modifiers, defoamers, preservatives such as formaldehyde, and dispersants such as sodium hexametaphosphate, sulfonated polystyrene, tetrasodium pyrophosphate or polyphosphates. In addition, the ink may contain a natural or synthetic thickener such as xanthan gum, guar gum, alginates, cellulose derivatives such as carboxymethyl cellulose, and synthetic polymers such as polyesters to increase the viscosity of the ink without increasing the starch solids or without using a starch of higher molecular weight. It is also noted that optionally a small amount (i.e., ordinarily no more than 5% of the ink weight) of mineral oil or solvent may be added to the composition if desirable.

Other recognized formulating techniques may be utilized to impart specific properties to the ink, to enhance its functional performance. For example, water resistance enhancers such as synthetic emulsions or latexes as may be represented by styrene-butadiene rubber, polyvinyl acetate, acrylates, and the like, and combinations thereof may be incorporated into the ink. Also useful in providing water resistance to the ink are starch crosslinking agents such as, e.g., urea-formaldehyde, ketone resorsinol-formaldehyde, melamine-formaldehyde, glyoxals and carbamates.

The final viscosity of the ink composition depends mainly on the type and amount of starch employed and the amount of water, as well as the additives present. Ordinarily, the RVF Brookfield viscosity at 20 rpm and at 25° C. may range from about 500 to 3600 cps using the ANPAPRESS system, but viscosities outside this range may also be operable depending, e.g., on the machine speed desired and the particular light-weight printing press system utilized.

The aqueous newsprint ink herein is generally prepared by cooking the starch in water by a batch or continuous process, if it is not cold-water dispersible; dispersing the colorant, dry or predispersed, in the starch cook; and mixing thoroughly until a smooth dispersion is obtained. If the starch is cold-water dispersible, then cooking is not required and the pigment is added to a dispersion of the starch in water. The viscosity stabilizer can be added, if desired, before or after dispersing of the starch; and the dispersant and/or defoamer, if any, is usually added to the starch cook before the pigment is added. The other optional ingredients are normally added to the final aqueous dispersion mixture. It is noted that the ink formulation may also be stored as a dilutable concentrate which can be brought to the desired viscosity by adding an appropriate amount of water thereto.

As discussed above, in the process of this invention the aqueous newsprint ink is employed as the ink for printing newsprint paper with a light-weight keyless printing press system. Suitable such keyless systems include, for example, the ANPAPRESS system or similar systems developed by Faustel Inc. or Tokyo Kikai Seisakusho, Ltd.

In the example which follow, the embodiments of the invention are described in further detail. All parts and percentages are given by weight and all temperatures in degrees Celsius unless otherwise noted. The viscosities in all examples are RVF Brookfield viscosities measured at 20 rpm and at 25° C. Each formulation contained less than 0.5% by weight of formaldehyde as a preservative. Color density was measured using a Photovolt or MacBeth (trademarks) Densitometer, and printability in the laboratory was measured with a Vandercook Universal I Test Press (trademark) unless otherwise indicated.

EXAMPLE I

Two ink compositions A and B containing waxy dextrin as the ink binder were prepared by suspending the binder in water, totally dispersing the carbon black pigment in the dextrin solution and mixing the dispersion. In both cases the pigment was well dispersed in the ink. The amounts of ingredients and viscosities of the inks are given below.

| Ingredients (%): | | A | B |
|---|---|---|---|
| Waxy corn dextrin | | 40.5 | 47.7 |
| Powdered carbon black pigment (Sterling R., trademark of Cabot Corporation) | | 10.0 | 10.0 |
| Water | | 49.5 | 42.3 |
| Viscosity (cps): Fresh | | 225 | 1490 |
| | After 1 month | 270 | 1040 |

From the viscosity data it is apparent that the waxy corn dextrin of Inks A and B did not significantly retrograde upon aging. When printed on newsprint paper both inks were smooth, dried quickly and had good color density. The pigment of the inks was strongly bound to the paper, as opposed to the pigment of a standard mineral oil newsprint ink having RVF Brookfield viscosity of 2400 cps, which was easily smeared on rubbing the paper.

Two other inks, designated C and D below, were prepared as described above except that potato and tapioca dextrins, respectively, were substituted for the waxy corn dextrin. The inks, whose ingredient and viscosities are given below, behaved similarly to Inks A and B above in terms of their printing properties.

| Ingredients (%): | C | D |
|---|---|---|
| Potato dextrin | 49.5 | — |
| Tapioca dextrin | — | 49.5 |
| Powdered carbon black pigment (Sterling R., trademark of Cabot Corporation) | 10.0 | 10.0 |
| Water | 40.5 | 40.5 |
| Viscosity (cps): Fresh | 1780 | 950 |

EXAMPLE II

The ingredients given below were employed to prepare three ink compositions A–C. The indicated starches were slurried in water at various solids levels, heated to 95° C., and held at 95° C. for about 20 minutes. The pigment was dispersed in each cooked sarch suspension in the given amount. The viscosities of each resultant composition are given below.

| Ingredients (%): | | A | B | C |
|---|---|---|---|---|
| Waxy corn starch | | 3.3 | 8.2 | — |
| Lightly acid-hydrolyzed waxy corn starch | | — | — | 12.3 |
| Carbon black pigment of Example I | | | | |
| Water | | 78.5 | 73.6 | 69.5 |
| Viscosity (cps): | | | | |
| | Fresh | 125 | 1180 | 2150 |

Inks A–C had good pigment dispersion, good color density and good printability. The carbon black pigment was strongly bound to the paper and no smearing resulted. Ink C, in particular, exhibited the superior flow and printability characteristics of a mineral-oil-based ink, but without the undesirable strike-through, offsetting and blurring of the ink of the prior art.

EXAMPLE III

This example illustrates the effect of chemical derivatization on the stability of the ink.

A waxy corn starch was hydrolyzed to a water fluidity of 80 and then treated with 12% acetic anhydride so that the acetyl content of the starch was 3%. Both the acetylated starch and an unacetylated fluidity waxy corn starch as control (designated as Inks B and A, respectively) were cooked for 20 minutes at about 95° C. Carbon black pigment was then dispersed in the cooked starches. The ingredients and viscosity of each ink are given below.

| Ingredients (%): | | A | B |
|---|---|---|---|
| Fluidity waxy corn starch | | 27 | — |
| Acetylated fluidity waxy corn starch | | — | 27 |
| Carbon black pigment of Example I | | 10 | 10 |
| Water | | 63 | 63 |
| Viscosity (cps): Fresh | | 1360 | 580 |
| | 2 days | 1610 | 625 |
| | 1 week | paste | 770 |

Initially both inks had good viscosity and good pigment dispersion and gave good printability and color density. After one week, however, only Ink B could be employed, with printing results being as good as when the ink was fresh.

EXAMPLE IV

This example illustrates the effect of addition of a viscosity stabilizer on the stability of the ink.

For preparation of Inks A–C equal portions of a waxy corn starch which was acid hydrolyzed to a water fluidity of 80 were each cooked in water for 20 minutes at about 95° C. A viscosity stabilizer consisting of either calcium chloride or urea was added to two of the cooked starches. Carbon black pigment was thereafter dispersed in each of the cooked starches A–C. The ingredients and viscosity of each ink are given below.

| Ingredients (%): | A | B | C |
|---|---|---|---|
| Fluidity waxy corn starch | 22.5 | 22.5 | 22.5 |
| Carbon black pigment of Example I | 10.0 | 10.0 | 10.0 |
| Water | 67.5 | 52.5 | 52.5 |
| Urea | — | 15.0 | — |
| Calcium chloride | — | — | 15.0 |
| Viscosity (cps): Fresh | 300 | 1000 | 1600 |
| 1 week | 1560 | 830 | 1575 |
| 1 month | pasted (very thick) | 1710 | 1520 |

All of the inks had good initial viscosity, good pigment dispersion and good printability. However, on aging for one month Ink A without stabilizer increased in viscosity to become a pasty mass. In contrast, Inks B and C essentially retained their initial viscosity on aging and there was no adverse effect on printability and color density as a result of adding the viscosity stabilizer thereto.

EXAMPLE V

This example illustrates the runnability of the ink composition herein on the keyless printing press system, as a verification of results obtained in the laboratory.

Two ink formulations A and B were prepared in the same manner as the inks of Example III containing the following ingredients and having the given viscosities.

| Ingredients (%): | A | B |
|---|---|---|
| Fluidity waxy corn starch of Example III | 20.29 | 24.51 |
| Calcium chloride | 12.02 | 14.53 |
| Carbon black pigment of Example I | 10.02 | 12.10 |
| Sodium hexamethaphosphate (as dispersant) | 0.10 | 0.12 |
| Defoamer | 0.02 | 0.02 |
| Water | 57.55 | 48.72 |
| Total Solids (%): | 42.5 | 51.3 |
| Viscosity (cps): Fresh | 500 | 3600 |

Both inks, which were viscosity stable, ran well on the ANPAPRESS keyless printing systems, with machine speeds of up to 1300 feet per minute readily achieved. The pigment was strongly bound to the surface of the paper. Ink B had particularly good color density due to its higher solids level. Without changing the variables of the ANPAPRESS equipment to accommodate the different viscosities, it was observed that an ink having a viscosity much lower than 500 cps splashed and ran off the printing plate, whereas an ink of viscosity above 4000 cps caused fiber picking and sticking. Different viscosity limits may result when the equipment variables are changed.

EXAMPLE VI

This example illustrates the preparation of a pregelatinized starch as the ink binder herein.

Drum-dried waxy corn starch was dispersed in cold water at 10% solids to which carbon black pigment of Example I was added under high agitation. The final composition contained 8.2% starch, 18.2% pigment and 73.6% water and had a fresh viscosity of 670 cps. The pigment dispersion, printability, viscosity stability and color density of the ink were good.

EXAMPLE VII

This example illustrates the use of corn starch derivatives as the ink binder herein.

Inks A and B were prepared by cooking oxidized corn starch and hydrolyzed corn starch acetylated with 5% acetic anhydride, respectively, at 20% solids for 20 minutes at about 95° C. Carbon black pigment was then dispersed in the cooked starches. The ingredients and viscosity of each ink are given below.

| Ingredients (%): | A | B |
|---|---|---|
| Oxidized corn starch | 18 | — |
| Acetylated hydrolyzed corn starch | — | 18 |
| Carbon black pigment of Example I | 10 | 10 |
| Water | 72 | 72 |
| Viscosity (cps)* Fresh | 375 | 5000 |

The higher viscosity of Ink B is mostly due to the lower degree of hydrolysis of corn starch. However, both inks showed good pigment dispersion, color density and printability.

EXAMPLE VIII

This example illustrates the use of an enzyme-treated starch in the ink composition herein.

An ink formulation was prepared by dispersing in cold water a starch hydrolyzed by means of enzyme to a dextrose equivalent of about 10 and recovered by spray drying. Carbon black pigment of Example I was added to the dispersion with stirring to give a composition containing 51% starch, 10% pigment and 39% water. The finished ink, which had a fresh viscosity of 1860 cps, had good pigment dispersion, printability and color density.

When 10% of the carbon black pigment of this ink is replaced with Powdura Blue GP (trademark for a dye of Sherwin-Williams Co.), an ink is obtained having a slightly bluish tone, but having all other properties substantially the same as those of the ink containing carbon black pigments as the only colorant.

EXAMPLE IX

In this example, which illustrates use of a thickener in the ink hereein, 1.5% of xanthan gum based on total formulation was added to Ink A of Example V (initial viscosity of 500 cps). The resulting ink, which had a viscosity of 1500 cps, ran well and improved the printability obtained with the ANPAPRESS printing system. Guar gum in the same amount and same formulation gave similar results. Both inks had good viscosity stability on aging.

EXAMPLE X

This example illustrates the use of varying amounts of carbon black pigment.

Three formulations A–C of the given viscosity were prepared with the indicated ingredients, following the procedure of Example I.

| Ingredients (%): | A | B | C |
|---|---|---|---|
| Waxy corn dextrin | 47.7 | 46.4 | 45.0 |
| Carbon black pigment of Example I | 10.0 | 12.5 | 15.0 |
| Water | 42.3 | 41.1 | 40.0 |
| Viscosity (cps): | 1050 | 1670 | 1580 |

The resultant inks were comparable in their properties except that the color density of the print was higher with inks having higher levels of pigment.

EXAMPLE XI

This example illustrates the use of predispersed carbon black pigment in the inks herein.

A composition of the following ingredients and viscosity was prepared wherein the waxy corn starch was cooked as in Example II.

| Ingredients: | Parts | % |
|---|---|---|
| Fluidity waxy corn starch | 20.2 | 20.2 |
| Calcium chloride | 13.5 | 13.5 |
| Pigment paste composed of 30% carbon black pigment, 5.5% surfactant, 15% propylene glycol and 49.5% water | 33.3 | 8.9 (pigment alone) |
| Water | 57.4 | 57.4 |
| Viscosity (cps): | | 3600 |

The ink composition had good pigment dispersion, viscosity stability, color density and printability, and the dispersed pigment showed no signs of incompatability with the starch solution.

EXAMPLE XII

This example illustrates the effective use of a smaller amount of a pigment having a high color density in the aqueous newsprint ink herein.

An ink composition was prepared as in Example I containing 55% of a waxy corn dextrin, 5% of a powdered carbon black pigment having a high color density (Regal 400R, trademark of Cabot Corporation), and 40% water. The resulting formulation upon testing had a fresh viscosity of 1510 cps and had good color density and printability.

In summary, the present invention is seen to provide a process for printing newsprint paper with an aqueous newsprint ink derived from readily available raw materials containing a starch, which ink is especially designed for conjunctive use with the light-weight keyless printing press system.

Now that the preferred embodiments of the present invention have been described in detail, various modifications and improvements thereon will become readily apparent to the practitioner. Therefore, the spirit and scope of the invention are to be limited only by the appended claims, and not by the foregoing specification.

What is claimed is:

1. An aqueous newsprint ink applicable for a light-weight keyless printing press system having a total solids content of about 13–80% and comprising about 2–30% of a carbon black pigment, about 3–60% of a dispersed starch, and water as the remainder of the ink in an amount to total 100%, wherein the percentages are by weight based on total weight of the ink.

2. The newsprint ink of claim 1 wherein said starch is a dextrin, a waxy fluidity starch or a derivatized fluidity starch.

3. The newsprint ink of claim 1 wherein the amounts of said carbon black pigment and starch are 10–25% and 15–55% by weight, respectively, and wherein the total solids content is 30–70% by weight.

4. The newsprint ink of claim 1 having a RFV Brookfield viscosity of 500–3600 cps at 20 rpm and at 25° C.

5. The newsprint ink of claim 1 wherein said carbon black pigment is partially replaced with a dye or pigment other than carbon black.

6. In a process for printing newsprint paper with a printing ink employing a light-weight keyless printing press system, the improvement which comprises using as the printing ink an aqueous newsprint ink having a total solids content of about 13–80% and comprising about 2–30% of a colorant consisting of a pigment, dye or mixture thereof, about 3–60% of a dispersed starch, and water as the remainder of the ink in an amount to total 100%, wherein the percentages are by weight based on total weight of the ink.

7. The process of claim 6 wherein said starch is a dextrin, a waxy fluidity starch or a derivatized fluidity starch.

8. The process of claim 6 wherein the amounts of said colorant, and starch are 10–25% and 15–55% by weight, respectively, and wherein the total solids content is 30–70% by weight.

9. The process of claim 6 wherein at least a portion of said colorant is carbon black pigment.

10. The process of claim 6 wherein said ink has a RVF Brookfield viscosity of 500–3600 cps at 20 rpm and at 25° C.

* * * * *